(No Model.)
T. D. DAVIS.
HAND RAKE.
No. 337,933. Patented Mar. 16, 1886.
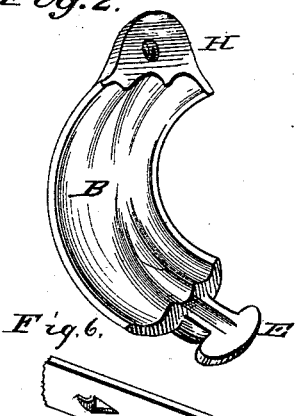
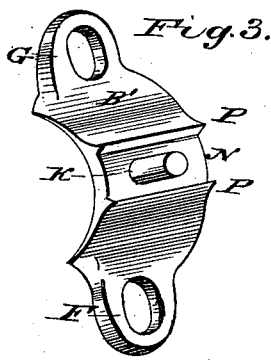
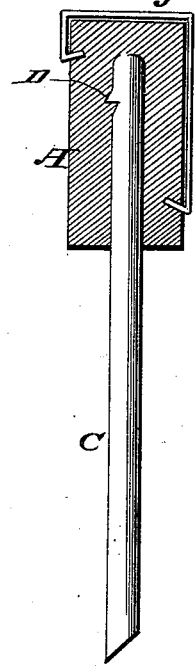
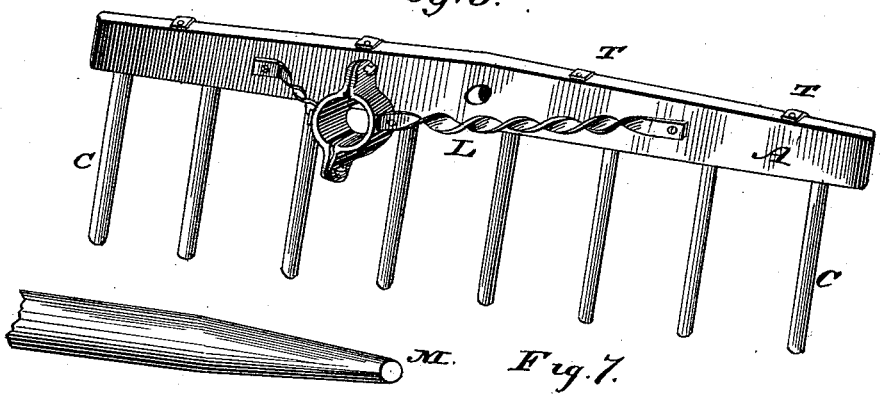
Witnesses:
Fred I. Hart
Fred G. Dieterich
Inventor
Theodore D. Davis

UNITED STATES PATENT OFFICE.

THEODORE D. DAVIS, OF WILLIAMSPORT, PENNSYLVANIA.

HAND-RAKE.

SPECIFICATION forming part of Letters Patent No. 337,933, dated March 16, 1886.

Application filed June 12, 1885. Serial No. 168,526. (No model.)

*To all whom it may concern:*

Be it known that I, THEODORE D. DAVIS, a citizen of the United States, residing at Williamsport, in the county of Lycoming and State of Pennsylvania, have invented certain new and useful Improvements in Hand-Rakes, of which the following is a specification.

My invention relates to improvements in hand-rakes; and it consists in, first, securing the teeth in the rake-head by means of a barb extending from the teeth and adapted to take into the wood of the head, and in providing the teeth with diagonal points; secondly, in the use of wear-irons applied to the rake-head to prevent undue wearing of the head; and, thirdly, in providing a two-part socket adapted to receive the handle and to be connected with the rake-head, all of which will appear more fully hereinafter. I attain these objects in the manner shown in the accompanying drawings, in which—

Figure 1 is a cross-section of a rake-head, showing the mode of securing the teeth, also the wear-irons and the points of the teeth; Figs. 2 and 3, detached views of the malleable-iron socket or clamp; Fig. 4, the fastening-screw; Fig. 5, a perspective of a rake-head; Fig. 6, a detached view of one of the braces, showing a spur struck up therefrom; and Fig. 7, a view of the under edge of the rake-head, showing the arrangement of the teeth.

Similar letters refer to similar parts throughout the several views.

The wooden head A, Fig. 1, is protected by thin iron casings attached, as shown, which may cover the entire top and sides, or be put on in sections, as shown at Fig. 5, and be secured by rivets or otherwise, if desired. The tooth C in cross-section is either oval, square, circular, rectangular, or double. When single, a blank for two teeth is cut from the rod and sheared diagonally in the middle, forming the points of the teeth.

The object in cutting the points of the teeth diagonally is to economize in the consumption of material and to provide a point for the teeth by the act of cutting off the rod from which they are made—or, in other words, to make the operation of cutting off the rod also make the point in a finished condition ready for use.

The shank has its end slightly rounded to facilitate its insertion, and one or more barbs, D, are raised. A hole of less diameter than the shank is made nearly through the head. It is then forced in until its end abuts against the wood or stop, thereby preventing it from working up through the head. The same result may be secured by extending the shank through the head and covering the end with a cap of wood or metal secured to the head; but the plan shown is preferable. When the shank is inserted, the fibers of the wood are compressed by the diagonal face of the barb and subsequently resume their former position, and also expand and fill the serrature under the barb, thereby firmly securing the tooth.

To prevent clogging when square teeth are used, they are placed so that their sides are diagonal to the line of the head.

When used on thrashing-floors or in the field, the points of the teeth are rounded.

The socket is composed of two pieces, B and B', Figs. 2 and 3, which are connected by passing the T-shaped neck or shank E through the oblong opening F, giving it a quarter-turn and securing the opposite end by passing the screw S, Fig. 4, through the opening G and screwing it into the threaded hole H, the annular flange I preventing the separation of the parts. The metal braces L, Fig. 5, having holes through their ends, are placed in the bed N, between the flanges P P, the rivet K, integral with the socket, passing through the brace and secured by riveting.

For field-rakes and where lightness is desired the braces may be made of angle or channel iron, or thin flat iron spirally wound or twisted, and notched at their edges near the end to fit spurs or lugs integral with the socket, which are bent over on the brace to secure it. The opposite end of the brace is attached to the head by bolts or screws which permit them to be easily detached for packing, &c. One or more spurs may be raised on the end and bedded in the head to prevent longitudinal movement, and when thin iron is used the end may be doubled and secured by a hook-headed bolt or rivet at the side of the brace. The handle M, Fig. 5, is passed through the socket, its tapered end driven into the hole in the head, and the socket clamped on the cylindrical part by the screw S, Fig. 4.

In reference to the subject-matter of claim 2 I desire to observe that I am aware that spikes provided with barbs are known.

What I claim, and desire to secure by Letters Patent, is—

1. In a rake, the combination, with the rake-head, of the wear-irons placed across the upper edge and secured to the forward and upper edges thereof.

2. In a rake, the combination, with the rake-head, of a rake-tooth having a barb projecting therefrom, the inclined surface of which is toward the upper end of the tooth.

3. In a rake, a socket composed of two parts, each having a stud or rivet projecting therefrom, and one part having a head and a narrow neck and a threaded hole, and the other part an aperture for the passage of the head, and another aperture for the passage of a connecting-screw.

4. In a rake, the combination, with the sectional socket provided with flanges and rivets or studs, of the braces secured to the sockets by the rivets or studs.

5. In a rake, the combination, with the head having teeth-holes, of the teeth fitted, respectively, in said holes and provided with barbs and diagonally-cut points.

6. In combination with head A and handle M, of clamp B B', braces L, teeth C, and wear-irons T, all substantially as set forth.

THEODORE D. DAVIS.

Witnesses:
S. M. SMITH,
JOHN G. READING, Jr.